Figures 1, 2, 3:
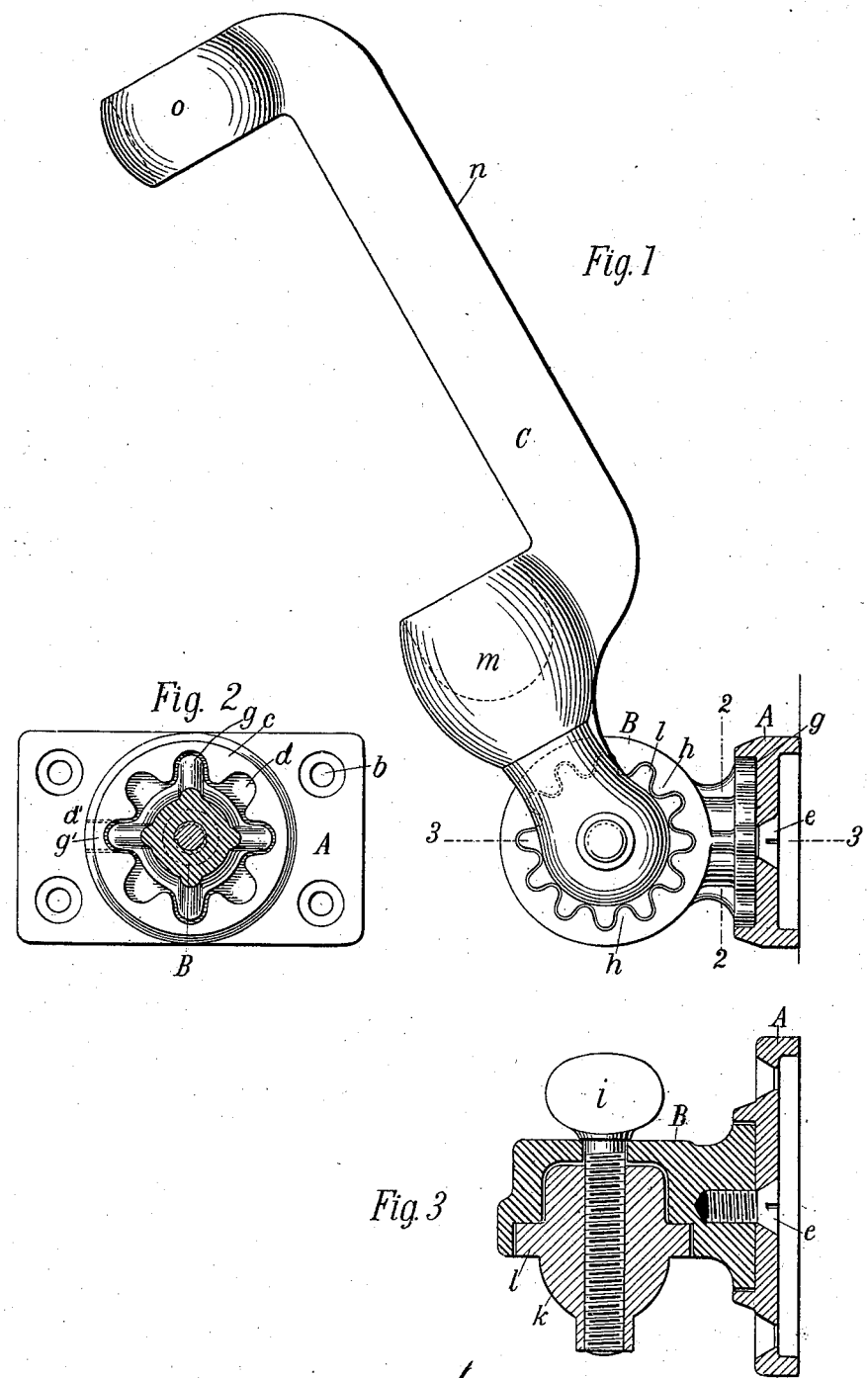

No. 661,048. Patented Nov. 6, 1900.
W. HART.
FLAGSTAFF HOLDER.
(Application filed Feb. 23, 1900.)
(No Model.)

Witnesses:
Raphaël Netter
M. Lawson Dyer

Walter Hart, Inventor
by Kerr, Page & Cooper, Att'ys

THE NORRIS PETERS CO., PHOTO-LITHO., WASHINGTON, D. C.

UNITED STATES PATENT OFFICE.

WALTER HART, OF NEW YORK, N. Y.

FLAGSTAFF-HOLDER.

SPECIFICATION forming part of Letters Patent No. 661,048, dated November 6, 1900.

Application filed February 23, 1900. Serial No. 6,145. (No model.)

*To all whom it may concern:*

Be it known that I, WALTER HART, a citizen of the United States, residing at New York city, borough of Manhattan, in the county and State of New York, have invented certain new and useful Improvements in Flagstaff-Holders, of which the following is a specification, reference being had to the accompanying drawings, forming a part of the same.

The object of my present invention is twofold—first, the production of a flagstaff-holding mechanism in which a compound angular adjustment in differing planes may be effected at one time, and, second, the provision of means whereby the vertical adjustment is secured without injurious strain upon the moving parts.

The invention comprises a base-plate for permanent attachment to a suitable support, an adjusting member attached to or united with the base-plate, and a flagstaff support or socket adjustably secured to the adjusting member.

The invention also comprises various details of construction of the several parts, as I shall describe below.

In the drawings, Figure 1 is a perspective view, partly in section, of my invention. Fig. 2 is a section upon line 2 2 of Fig. 1. Fig. 3 is a section upon line 3 3 of Fig. 2.

A represents a substantially flat base-plate provided with means, such as screw-holes $b$, for securing it to any suitable support. The upper side of the base-plate A has a saucer-like receptacle $c$, which is corrugated, as at $d$, or the channels may extend through the walls of the receptacle, as indicated by the dotted lines at $d'$, Fig. 2. Through the base-plate and up into the receptacle projects a screw $e$, which is designed to secure the adjusting member B of my device to the base-plate. This adjusting member B is also provided upon its lower end or foot with peripheral projections $g$, which engage with the channels or corrugations $d$ to secure it in any desired axial position. An alternative form of these projections is shown in dotted lines at $g'$, Fig. 2. The upper part of the adjusting member B is substantially cylindrical, (see Fig. 3,) closed at one end, and has its open end interiorly toothed or corrugated, as at $h$, Fig. 1. These teeth $h$ extend back for a short distance only from the open end of B, Fig. 3, the rest of the interior of B forming a smooth-faced socket, as shown. From the closed end of B a screw $i$ projects into the interior, by which the flagstaff-support C is secured to the adjusting member B of my device. This support C is provided at its lower end with a lateral projection or boss $k$, which fits rotatably in the socket of B. This boss $k$ is bored and screw-threaded for engagement with the screw $i$. The boss $k$ is also provided with peripheral teeth $l$ to engage with or lock the teeth $h$ of the adjusting member B. The support C is otherwise of ordinary construction, comprising, for example, a socket $m$, a standard $n$, and a ring $o$.

It is evident that the adjusting member B and with it the support C may be adjusted to any required axial position by loosening screw $e$ until the projections $g$ are released from engagement in the recesses $d$, turning the adjusting member to the desired position, and locking the teeth again by tightening screw $e$. So, too, when the angular adjustment of the flag-support C is to be changed screw $i$ is loosened until the teeth $l$ and $h$ are disengaged, and then the part C is rotated to the required position or angle. It should be observed, however, that when these teeth $l$ and $h$ are so disengaged the smooth-faced nose or boss $k$, being longer than the depth of teeth $l$, is still in engagement with the interior of the socket of B. Thus the weight of the flag-holder and flag is distributed between $k$ and B, and there is no strain upon the screw $i$. By this means a serious objection to standards previously made is avoided.

Various modifications of my device are possible. For example, the base-plate and adjusting member may be permanently secured together in a structure in which the flag-support is attached to the adjusting member in substantially the manner shown, or the flag-support and adjusting member may be united by a different adjustment from that shown without substantial variation in the base-plate arrangement. I do not intend to limit myself to the construction shown.

What I claim is—

1. In a flagstaff-holder, the combination of a staff-supporting member having at its lower end a lateral projection, said projection being peripherally toothed for a part of its length, an adjusting member having a socket into which said projecting member enters, said socket being correspondingly toothed for a part of its length, and a base-plate upon which said adjusting member is adjustably mounted, substantially as and for the purposes described.

2. In a flagstaff-holder, the combination of a base-plate, an adjusting member mounted thereon and having a socket smooth-bored for most of its length, and interiorly toothed or corrugated at one end, and a flag-supporting member provided at its lower end with a lateral projection comprising a smooth portion revolubly fitting into said socket, and a series of peripheral teeth or corrugations for engaging with the corresponding teeth in said socket, substantially as and for the purposes described.

3. In a flagstaff-holder, the combination of a staff-supporting member having at its lower end a lateral projection comprising a smooth portion and a peripherally-toothed portion, and an adjusting member suitably mounted or supported, said adjusting member being provided with a socket into which said lateral projection loosely fits and with teeth for engaging or locking said peripherally-toothed portion, substantially as and for the purposes described.

4. In a flagstaff-holder, the combination of a base-plate, an adjusting member seated upon said base-plate and detachably secured thereto, said adjusting member having a socket interiorly toothed for a part only of its length, means for securing axial adjustment of said adjusting member upon said base-plate, a staff-supporting member detachably secured to said adjusting member and provided with a projection or boss entering said socket, substantially as and for the purposes described.

WALTER HART.

Witnesses:
M. LAWSON DYER,
JOHN C. KERR.